United States Patent [19]

Gakhar et al.

[11] Patent Number: 5,090,461
[45] Date of Patent: Feb. 25, 1992

[54] ROUTER ATTACHMENT PERMITTING CUTTING OF DENTIL MOULDING

[75] Inventors: Ved P. Gakhar, Louisville, Ky.;
Joseph H. Ballou, Elizabeth, Ind.;
James M. Leubbers, Louisville; D.
M. Szymanski, Prospect, both of Ky.

[73] Assignee: Vermont American Corporation, Louisville, Ky.

[21] Appl. No.: 557,396

[22] Filed: Jul. 23, 1990

Related U.S. Application Data

[63] Continuation-in-part of Ser. No. 362,215, Jun. 6, 1989, Pat. No. 4,942,912.

[51] Int. Cl.$^5$ .............................................. B27C 5/10
[52] U.S. Cl. ................... 144/136 C; 30/373; 30/374; 144/134 D; 144/136 R; 144/371; 409/182

[58] Field of Search .............. 144/2 R, 134 R, 134 D, 144/136 R, 136 C, 137, 371; 30/373, 374; 409/182

[56] References Cited

U.S. PATENT DOCUMENTS

| | | | |
|---|---|---|---|
| 4,858,662 | 8/1989 | Bosten et al. | 144/134 D |
| 4,913,204 | 4/1990 | Moores et al. | 144/136 C |
| 4,971,122 | 11/1990 | Sato et al. | 144/136 C |

Primary Examiner—W. Donald Bray
Attorney, Agent, or Firm—Middleton & Reutlinger

[57] ABSTRACT

A router attachment which is particularly useful for cutting decorative slots or grooves in wood and/or other materials, particularly those decorative cuts that are present in dentil moulding(s).

8 Claims, 11 Drawing Sheets

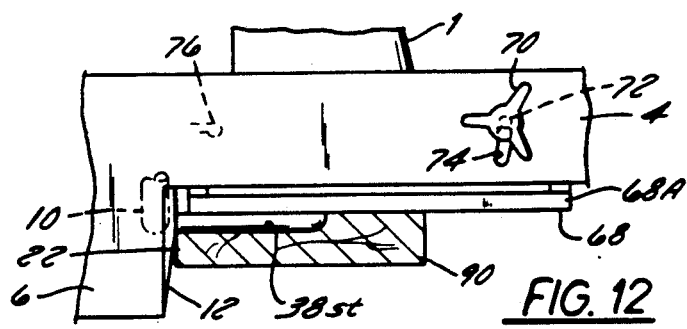
FIG. 12
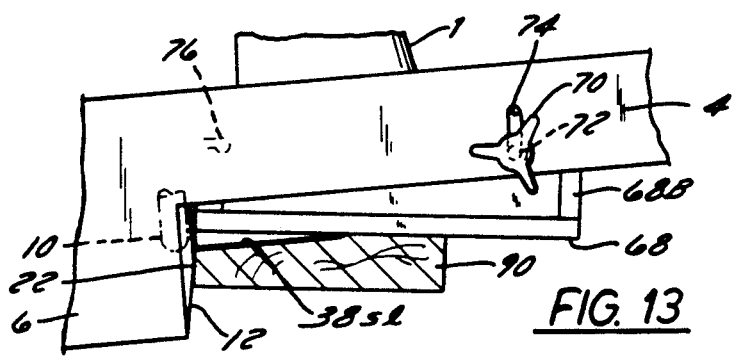
FIG. 13
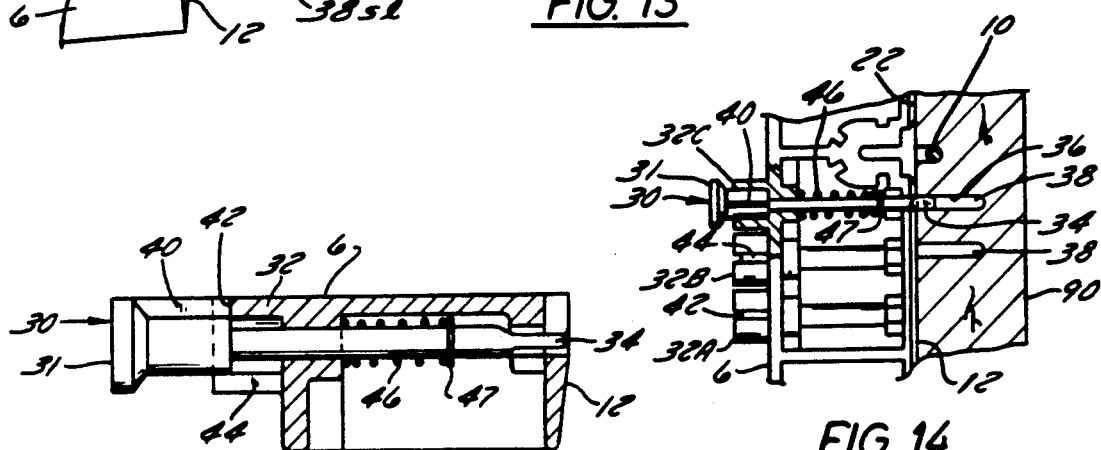
FIG. 15
FIG. 14
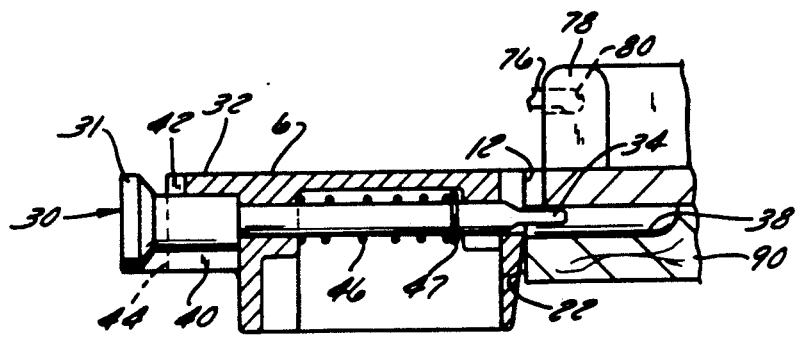
FIG. 16

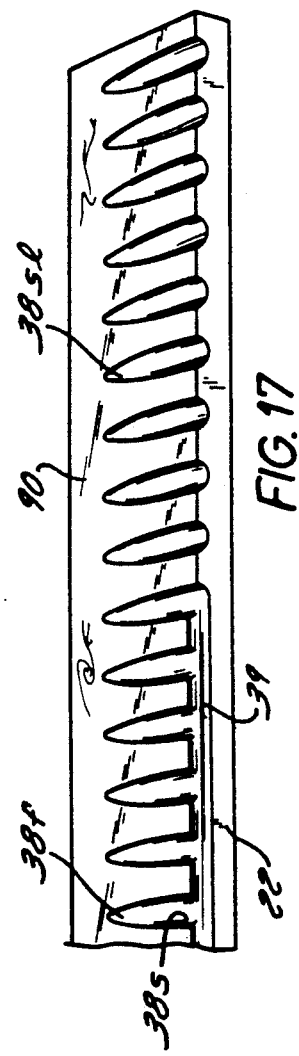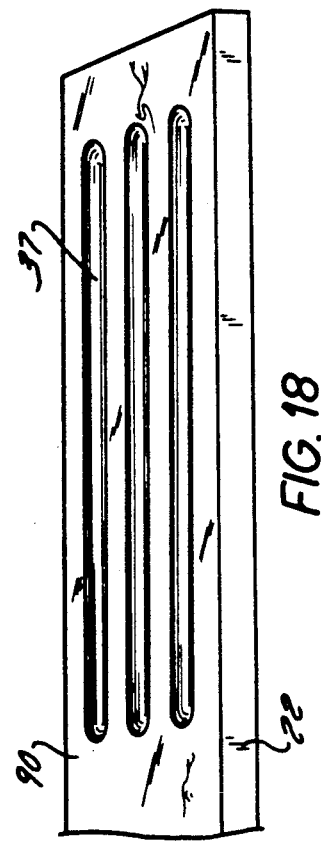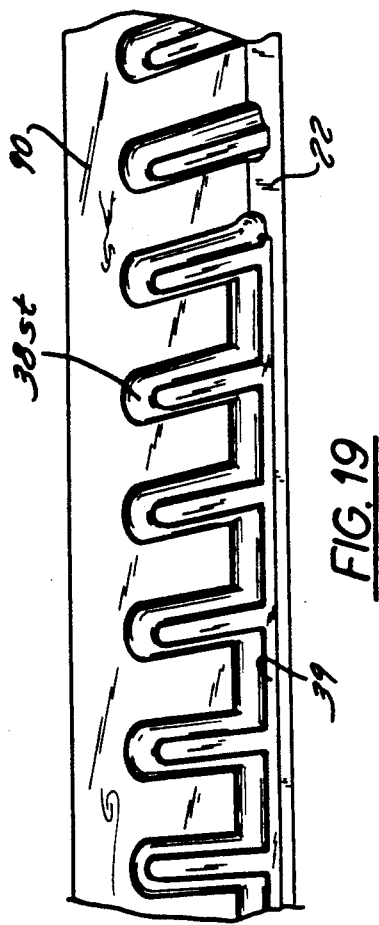

ROUTER ATTACHMENT PERMITTING CUTTING OF DENTIL MOULDING

RELATED CASE

This is a continuation-in-part of Ser. No. 07/362,215, filed June 6, 1989, now U.S. Pat. No., 4,942,912. Priority of said prior application is claimed for subject matter that is common to both applications.

BACKGROUND OF THE INVENTION

The present invention pertains to router attachments. This particular router attachment is especially useful in cutting decorative slots or grooves in wood and/or other materials, particularly those decorative cuts that are present in dentil moulding(s).

Dentil moulding has been known for many years, and recently it has again become a popular home decorating technique, because a home with decorative dentil moulding presents a very impressive and attractive appearance. However, before the present invention, the cost of obtaining dentil moulding was prohibitive for many home-owners, as dentil moulding was generally available only from a professional mill equipped with very sophisticated and expensive milling equipment, well beyond the budget of most do-it-yourself home woodworkers. Not surprisingly, because of the high investment cost of such sophisticated machinery to the mills, dentil moulding has heretofore generally been available only at a premium price.

The present invention makes it possible for a do-it-yourselfer to produce a variety of dentil moulding designs, using only ordinary woodworking skills associated with working a common router. The present invention renders the common woodworking router capable of producing dentil cuts, including both fluting cuts and edging cuts, which may be straight (i.e., constant depth, from start to finish) or tapered (i.e., deeper at the beginning of the cut than at the end of the cut). The variety and complexity (or simplicity) of dentil designs available from using the present invention are limited only by the imagination of the user.

The present invention will be very popular with do-it-yourself woodworkers because of its ease of use, and the fact that the present invention will make it possible for them to outfit their homes with expensive-looking dentil moulding for a quite nominal cost.

The idea of using a router to make such dentil cuts would generally be dismissed, because a router ordinarily cannot make a repeatable series of cuts into wood at predetermined lengths and at closely controlled distances apart. Further, routers do not ordinarily have the capacity to cut tapered cuts. The present invention addresses, and overcomes, all these usual operating limitations of a router, and renders most home routers capable of making complex and repeatable dentil cuts.

SUMMARY OF THE INVENTION

The present invention solves the problems of the prior art by providing an inexpensive router attachment which, when used with most common woodworking routers, will permit the do-it-yourself home woodworker to make dentil cuts with his or her router. Thus, the present invention permits home woodworkers to take advantage of dentil moulding techniques with a small investment in equipment.

The present invention also overcomes the problems of other router attachments by providing a stable and repeatable initial cutting position and by closely controlling the movement of the router bit relative to the workpiece. This is important for dentil moulding cuts, because if the decorative slots are not uniformly spaced apart and of uniform length, the appearance of the dentil moulding will be destroyed.

Perhaps most importantly, the present invention overcomes the high cost associated with dentil moulding. As stated above, ordinarily it is beyond the capability of most home woodworkers' usual tools to produce dentil moulding, so purchasing dentil moulding from a mill is cost-prohibitive for most home woodworkers, who have already had to purchase a table saw or radial arm saw, a router, a sander, and perhaps other expensive tools. For example, at present, even a simple dentil moulding design in 1"×4" lumber costs about $1.75 per running foot in the inventors' home area at the present time. Thus, to equip a 12'×12' room with purchased dentil moulding would cost about $84.00 for material cost.

Using the present invention, the same (or an even more complex and appealing) dentil design could be produced at home with a router in about 30 minutes, using plain 1"×4" lumber which could be purchased to cover the same 48 lineal feet for only $16.00 or so. Even if you "charged for" the do-it-yourselfer's time, the cost of providing dentil moulding for the same 12'×12' room with the present invention would be about $39.00, compared to $84.00 for purchased dentil moulding. Since many dentil moulding designs include multiple pieces of dentil moulding (for example, it is not uncommon to see dentil moulding comprised of three or more separate pieces of wood, each with a different dentil design cut into them), the actual savings to the home woodworker flowing from use of the present invention will be likely be in excess of fifty percent (50.0%), compared to the cost of purchased dentil moulding.

BRIEF DESCRIPTION OF THE DRAWINGS

FIGS. 12 and 13 are side elevation views of the present invention upon a workpiece, FIG. 12 showing the position of the liftplate of the present invention when it is desired to cut straight dentil cuts, and FIG. 13 showing the position of the lift plate of the present invention when it is desired to cut tapered dentil cuts;, FIG. 14 is a cutaway view of the indexing pin means of the present invention;

FIGS. 15 and 16 are side cross-sectional views of the indexing mechanism of the present invention, FIG. 15 showing the indexing pin in retracted position, and FIG. 16 showing the indexing pin in engaged position;

FIGS. 17, 18 and 19 show some of the types of dentil cuts that may be accomplished with the present invention.

DETAILED DESCRIPTION OF THE PREFERRED EMBODIMENT

(Best Mode)

Figure 21:
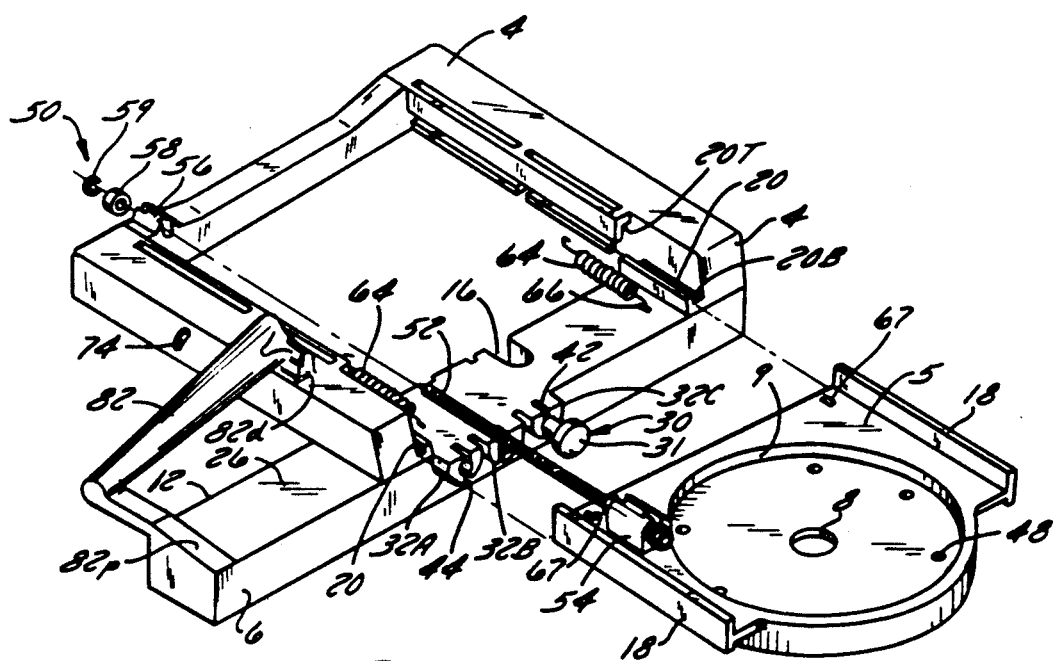
FIG. 21 is a left top perspective view of the slidable flat plate/carriage of the present invention, showing how it fits onto the top frame member of the present invention.
Figure 20:
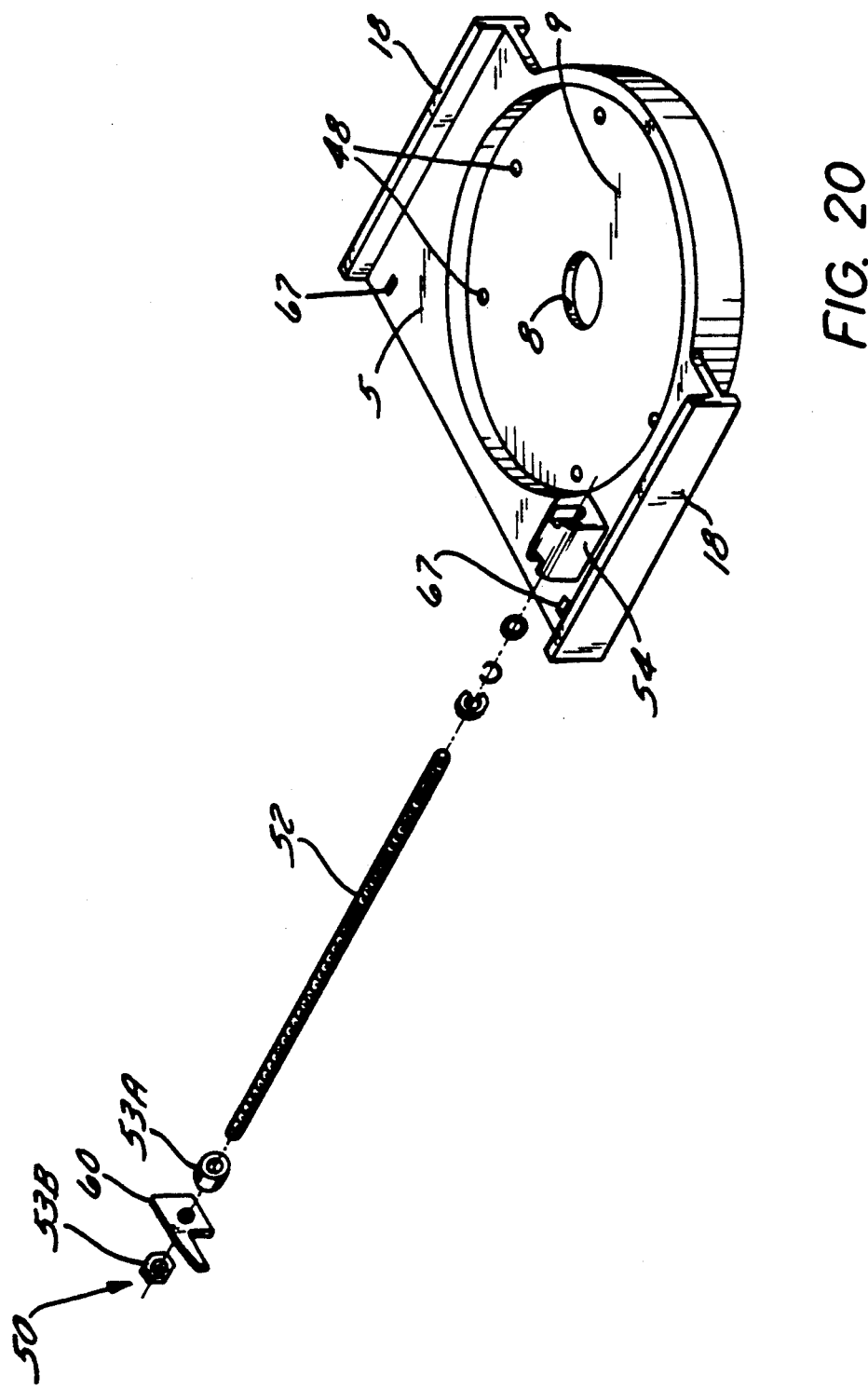
FIG. 20 is a left top perspective view of the slidable flat plate or carriage of the present invention, also partially showing the length of cut assembly in exploded fashion.

The router attachment 2 of the present invention is made of two main parts, a top rectangular frame member 4, the greater dimension of which is affixed in perpendicular relation to its base member 6. Rectangular frame member 4 is adapted to receive a carriage member or carriage 5 (see. FIGS. 20, 21) which is received onto top rectangular member 4 in a slidable relationship along grooves and ridges 18, 20. Carriage member 5 is provided with screw holes or other fixing means 48 adapted to cooperatively receive a router 1, and is further provided with a central hole 8 large enough to permit the bit or blade 10 of the router 1 to protrude therethrough. Carriage member 5 may further be provided with a recess 9 to more securely receive and hold router 1. The router bit 10 may be of any desired size (up to, for example, about ⅜" is diameter) and provided with any desired cutting contour, so as to produce the dentil cut contour desired, as, for example, those shown in FIGS. 17-19.

The base member 6 of frame 4 has a flat abutting surface or fence surface 12 to engage the corresponding abutting surface 22 of a workpiece 90. Base member 6 has a flat upper resting surface 26 and is further provided with a central opening or slot 16 which extends through the flat abutting surface 12. This central opening 16 provides room for the router bit 10 to move so that it can begin in a recessed position behind flat abutting surface 12 and then move forward beyond fence surface 12 to contact the corresponding abutting surface 22 of the workpiece 90. Top frame member 4 and base member 6 thereof are adapted to receive a liftplate 68 which in turn defines a series of elongated holes or slots 11, which permit sawdust to fall through base 6.

Top frame member 4 has a pair of elongated grooves 20 projecting downward along the sides 28R, 28L of frame member 4, while carriage 5 is provided with a corresponding pair of elongated T-shaped ridges 18, the top portions of which are received into the corresponding grooves 20T of top member 4, and the bottom portions of which are received into corresponding grooves 20B. This means that when frame member 4 and carriage member 5 are assembled with the T-shaped ridges 18 of the carriage 5 placed into the grooves 20T and 20B of frame member 4, the carriage 5 can only move front to back in a perpendicular direction relative to abutting surfaces 12 of base member 6 and 22 of workpiece 90 The T-shaped ridges 18 and grooves 20T and 20B, or the entire base member 6 top member 4 and carriage member 5, may be made of materials such as special polymers which reduce the amount of friction caused by the sliding of carriage member 5 along frame member 4 relative to each other.

Figure 7:
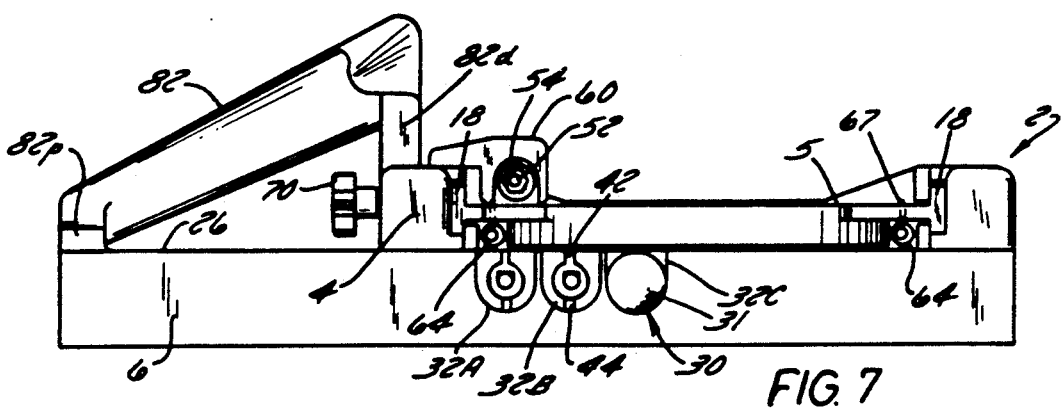
FIG. 7 is a front elevation plan view of the present invention, without a router mounted thereon.
Figure 11:
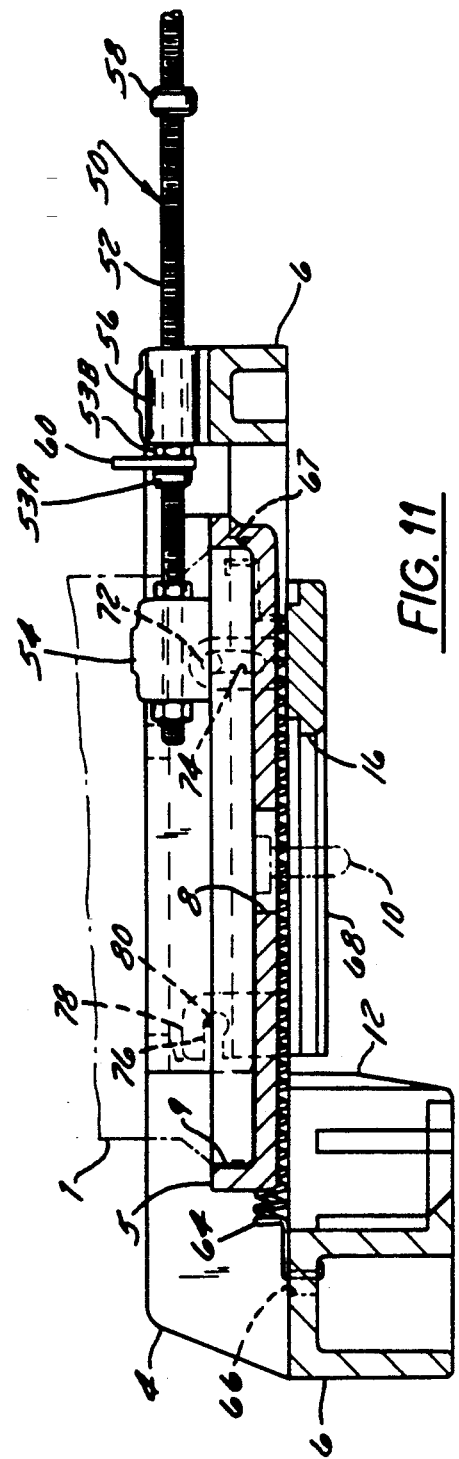

As shown in FIGS. 20 and 21, carriage 5 is maintained in spring-biased slidable relationship with frame member 4 along the paths defined by grooves 20 of frame member 4 and the ridges 18 of carriage member 5, by means of a pair of springs 64 anchored at point 66 to base member 6 and at point 67 on carriage member 5, best shown in FIGS. 20 and 21; see also. FIGS. 7 and 11. The biasing may be provided in any direction, but is normally provided to urge carriage 5 to retract into frame 4 and to hold base member 6 of frame 4 against workpiece 90.

Base member 6 includes a retractable indexing pin assembly 30 therethrough which fits into one of three indexing apertures 32A, 32B, 32C which traverse through base member 6. As best revealed in FIGS. 9, and 14-16, indexing pin assembly 30 has a distal end 34 which when engaged protrudes beyond fence surface 12 to engage indexing edge 36 of the most recently cut dentil slot 38 in the workpiece 90 At its proximal end, indexing pin assembly 30 is equipped with a rotating knob 31 and a positioning blade or tang 40 Which fits into positioning slots 42, 44 in the outer surface of indexing aperture 32. One of the slots 42, 44 permits the indexing blade or tang 40 to travel inward a sufficient distance to permit the distal end 34 of the indexing pin assembly 30 to protrude beyond abutting surface 12 of base member 6 to engage the workpiece 90, while the other indexing slot 42, 44 permits the indexing pin assembly only a limited amount of inward travel so that the distal end 34 of the indexing pin assembly does not protrude beyond abutting surface 12 of base member 6. Indexing pin assembly is spring-biased by spring 46 retained by retainer 47, so that indexing pin assembly 30 is normally urged toward the pin engage position.

Figure 1:
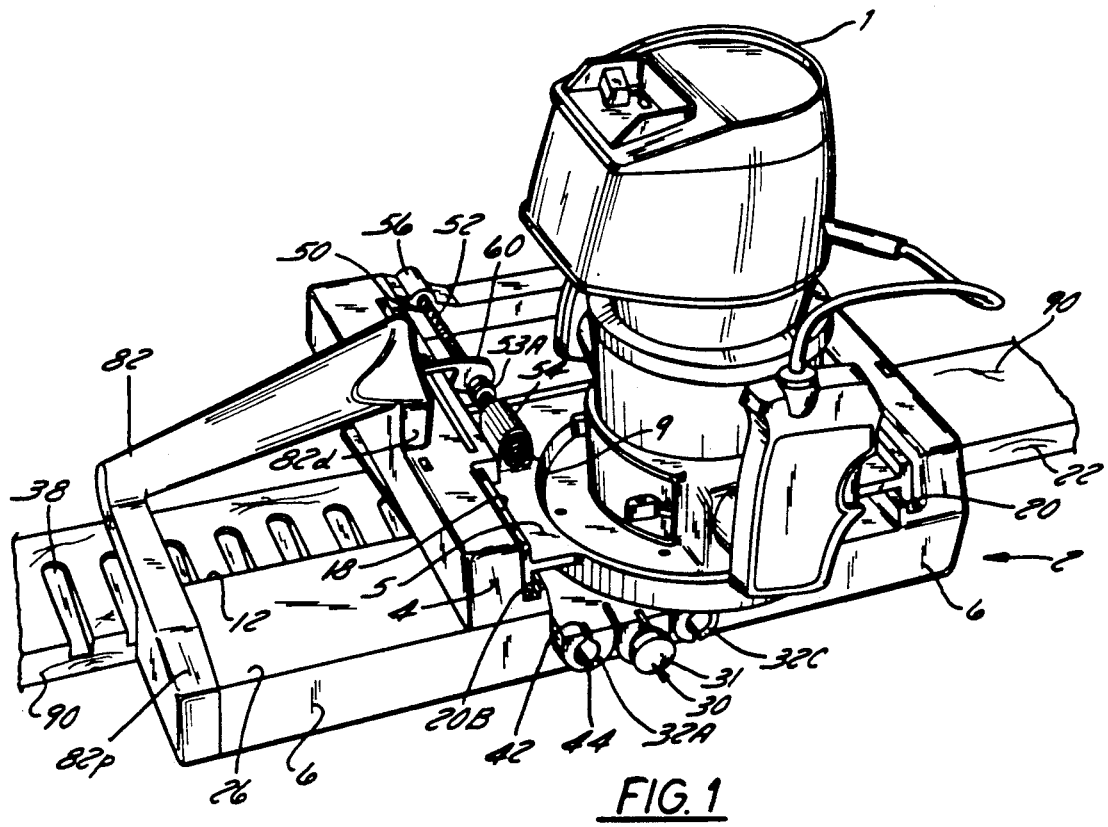
FIG. 1 is a left perspective view of the present invention in operating position upon a workpiece, with a router mounted thereon.
Figure 2:
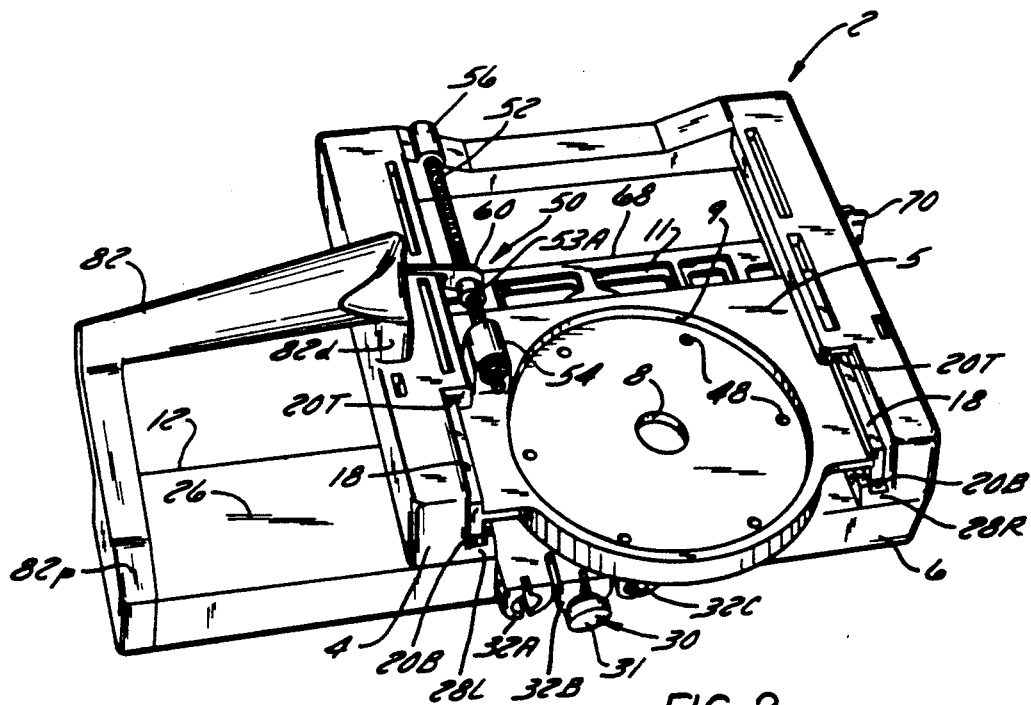
FIG. 2 is a left perspective view of the present invention, without a router thereon.
Figure 3:
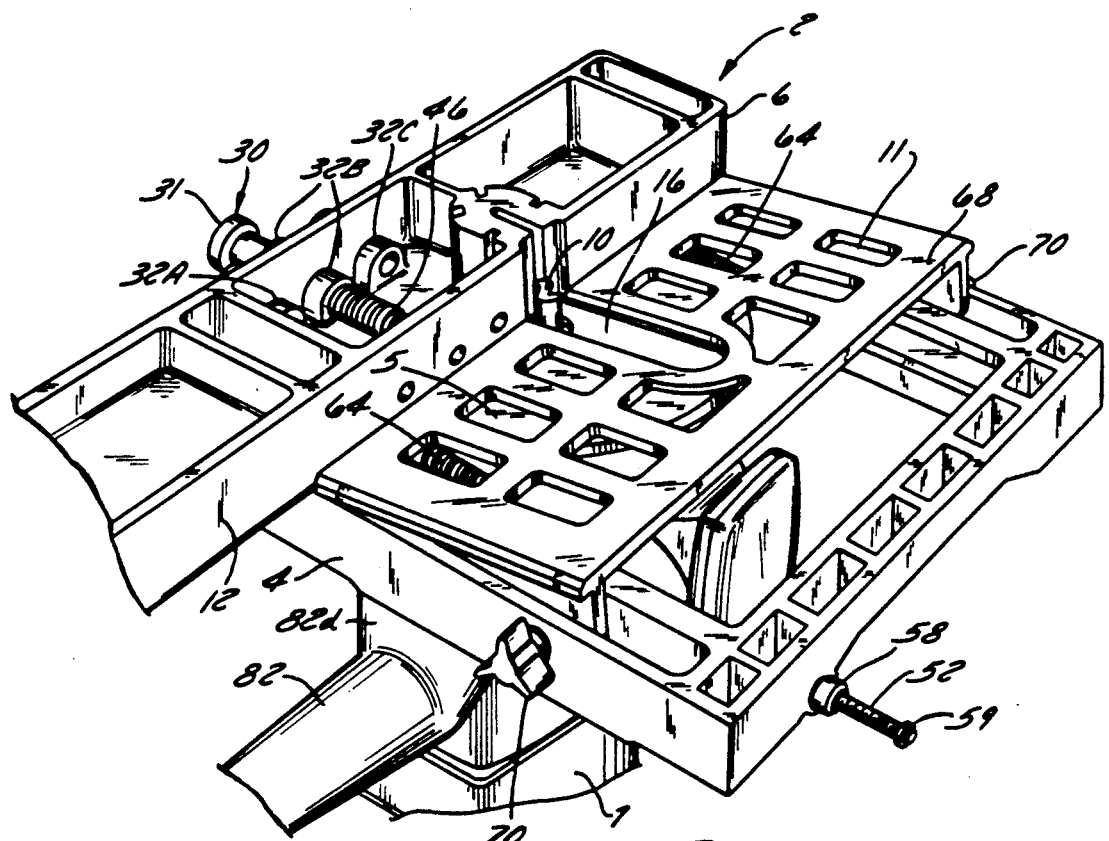
FIG. 3 is a bottom perspective view of the present invention with a router mounted thereon, showing the lift plate thereof in elevated position.
Figure 5:
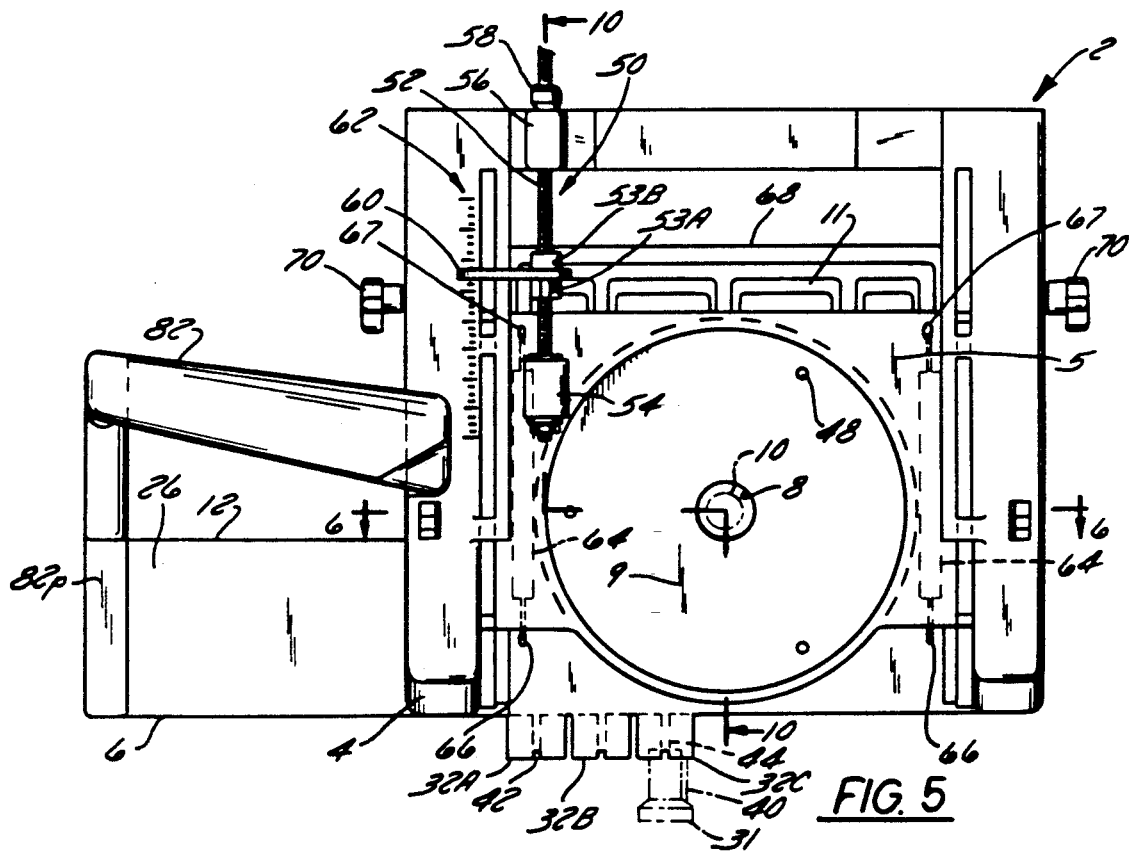
FIG. 5 is a top plan view of the present invention, without a router mounted thereon.
Figure 6:
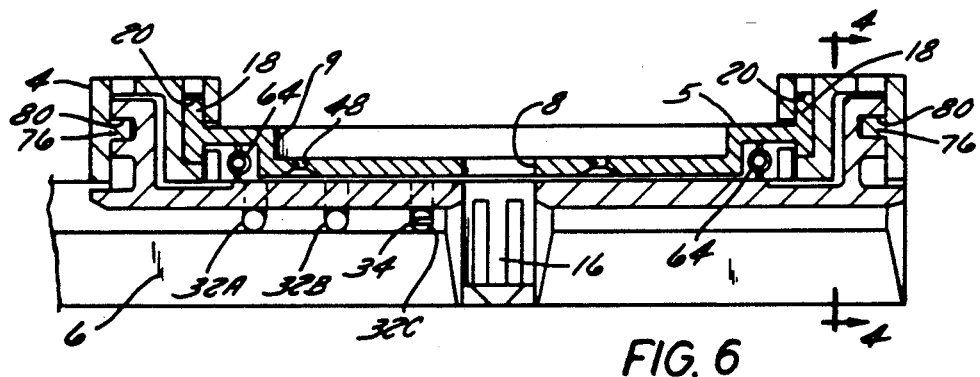
FIG. 6 is front cross-sectional view of the present invention, taken along line 6—6 of FIG. 5.

The carriage member 5 is further provided with an adjustable length-of-cut mechanism, referred to collectively by reference 50, shown most clearly in FIGS. 1, 2 and 5; an exploded view of the length-of-cut mechanism is also partially shown in exploded fashion in FIGS. 20 and 21. Length of cut mechanism 50 includes a threaded rod 52 which is engageable at its proximal end in fixed relation through housing 54 to carriage 5, as, for example by a locking nut and washer (shown, but without reference numbers), and engageable in selected relationship at its distal end to top frame member 4 through housing 56. The selected relationship is maintained by threaded knurled knob 5 which is prevented from screwing off threaded rod 52 by fixed retainer 59 (FIG. 3, 21) Length of cut position pointer 60 may be fixed in position along threaded rod 52 (as, for example by a pair of threaded nuts or threaded knurled knobs 53A, 53B) to indicate on depth of cut indicia scale 62 when the router bit 10 is in starting position with respect to abutting surface 22 of workpiece 90. Then, as carriage 5 (with router 1 thereon) is pushed forward to accomplish the dentil cut, pointer 60 will reveal the length of cut traversed. When locking nut 53B contacts housing 56 of top frame member 4, carriage 5 can go forward no more, and the dentil cut has reached its selected end. By utilizing the same position of nut 53B, the same length of cut can be achieved in successive cuts.

Figure 8:
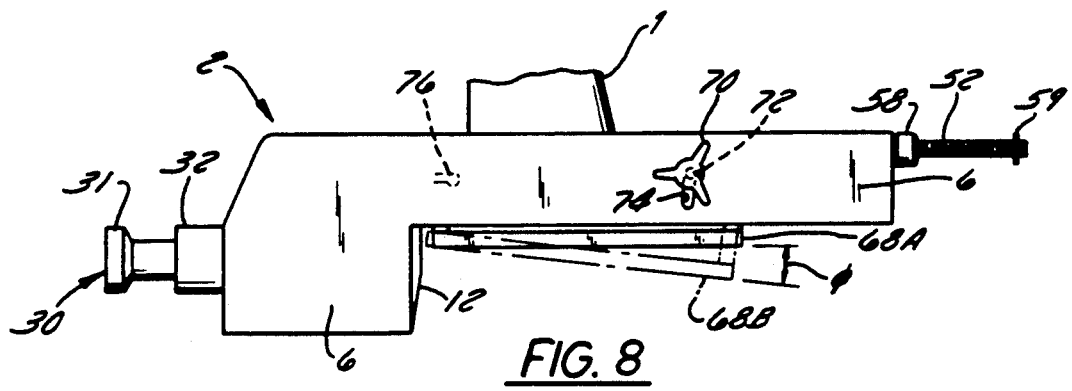
FIG. 8 is side elevation plan view of the present invention, showing the two positions of the lift plate thereof.
Figure 9:
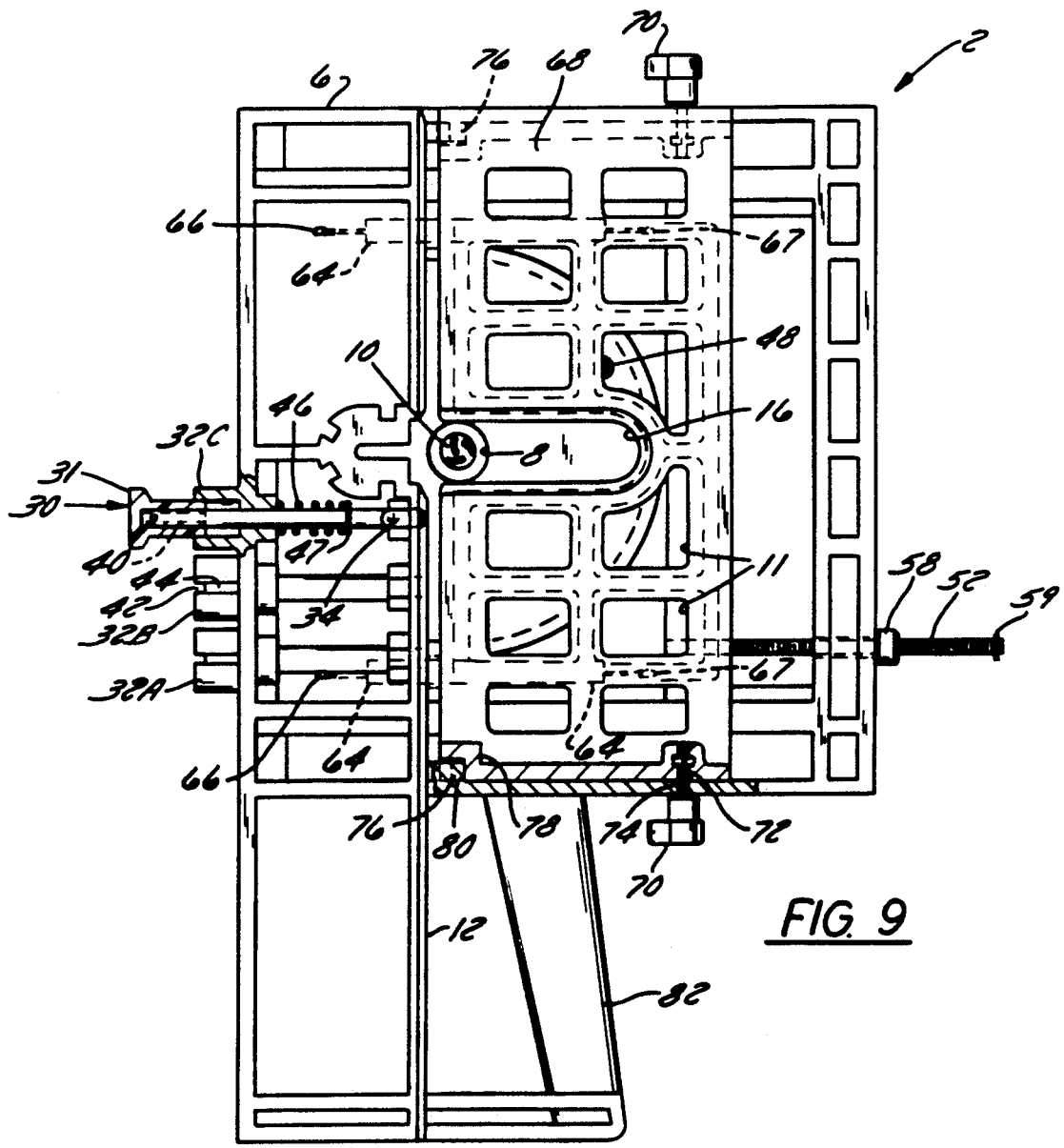
FIG. 9 is a bottom plan view of the present invention.
Figure 10:
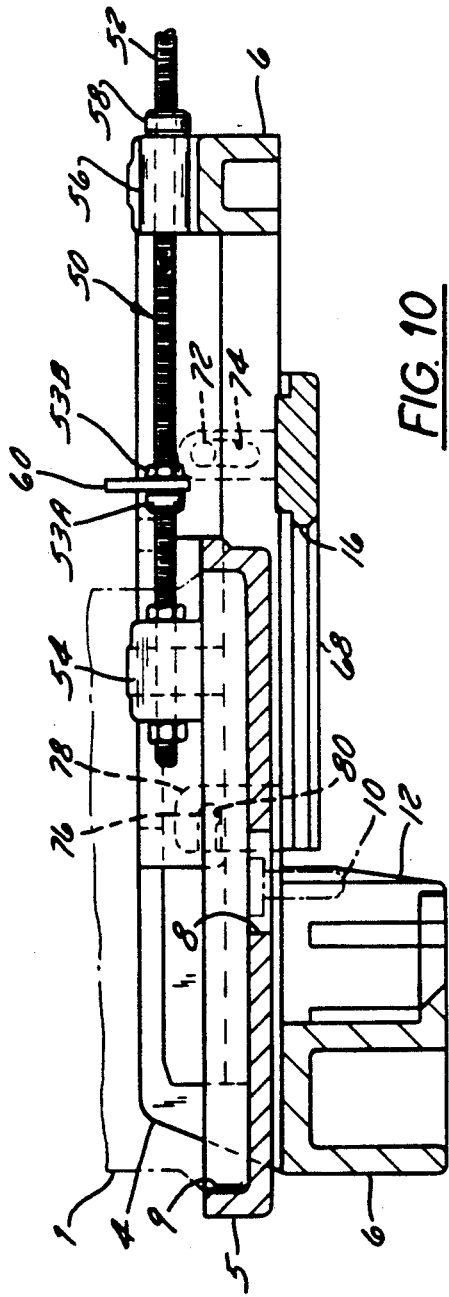
FIGS. 10 and 11 are side cross-sectional views of the present invention taken along line 10—10 of FIG. 5, FIG. 10 showing the present invention at the beginning of a dentil cut, and FIG. 11 showing the invention at the end of a dentil cut.

Oftentimes, it is desired to make tapered dentil cuts, with the depth of cut varying from the leading edge of the dentil moulding to the interior thereof, as shown in FIG. 17, and also in FIG. 1. As revealed in FIGS. 4 and 4A, the present invention is provided with a lift plate 68 on the underside of carriage 5 and frame member 4 as it is affixed to frame member 4. The lift plate 68 is attached to frame member 4 by a threaded rod 72 of thumbscrew 70 through an aperture 74 in each of the sidewalls of base member 6, and the position of the lift plate 68 relative to base member 6 is controlled by thumbscrew 70. In a first position 68A (FIG. 8, FIG. 12), lift plate 68 is parallel to the surface of frame member 4 and the top surface or workpiece 90; this first position will cut a straight uniformly deep dentil cut 38st from initialization to completion (see. FIG. 19). In a second position 68B (FIG. 8, FIG. 13), the lift plate is angled relative to the frame member 4 and the workpiece 90 on which the router attachment sits; this will cut a slanted dentil cut 38sl, where the depth of cut is greater at initialization than at completion (see. FIG. 17). Although it is possible to provide any number of selected angles for slanted dentil cuts, at this time the present invention is provided with only two positions for the lift plate, parallel and an angle lift, indicated by the angle in FIG. 8, presently provided at 7.5 degrees elevated lift.

Figure 4:
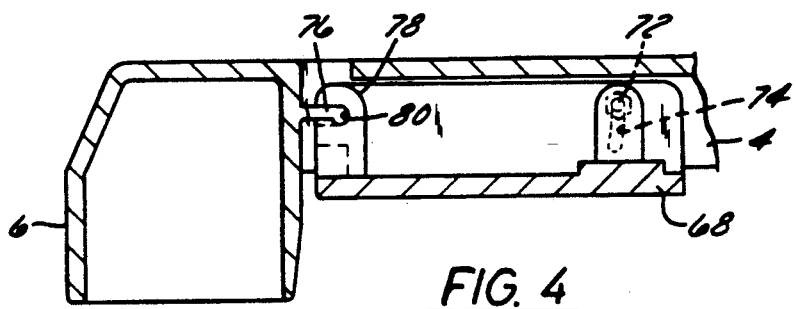
FIG. 4 is a side cross-sectional view of the frame of the present invention, taken along line 4—4 of FIG. 6, showing the operation of the lift plate of the present invention.
Figure 4A:
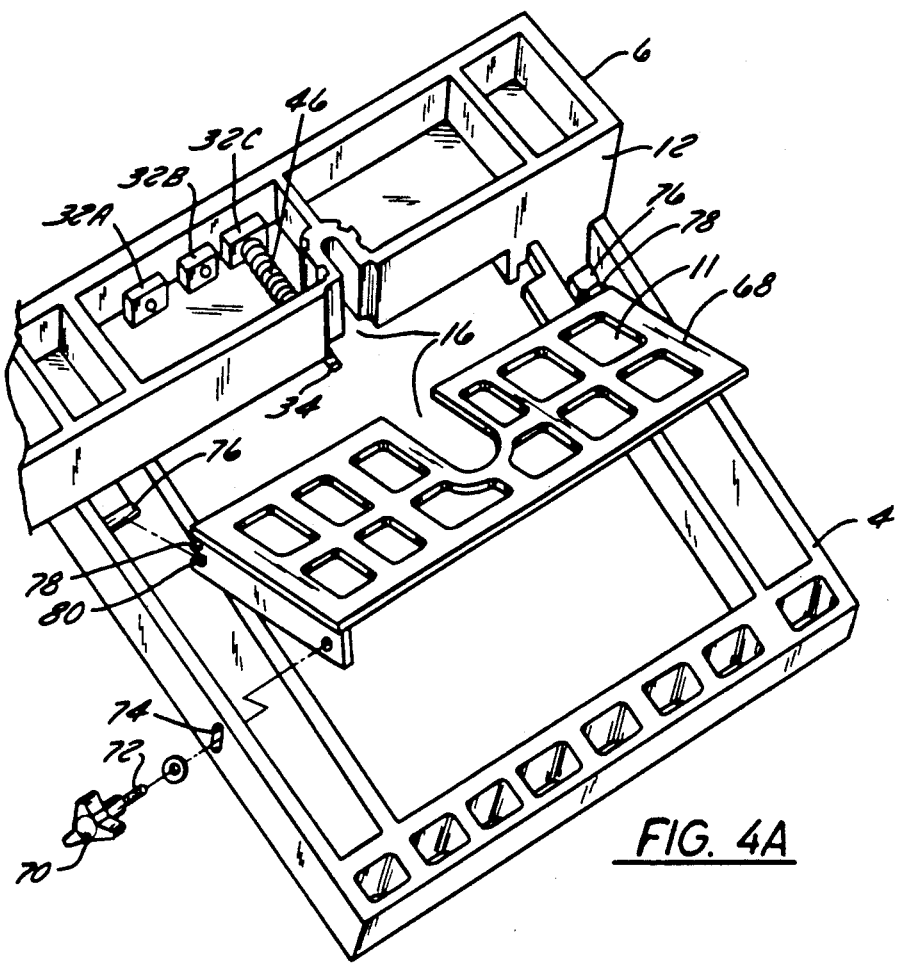
FIG. 4A also shows, in perspective view, the lift-plate.

The method of attaching lift plate 68 to the router attachment of the present invention is also disclosed in FIGS. 4 and 4A. Base member 6 has one or more pivot arms 76 (we have found it best to provide two pivot arms, one at each side of carriage 5) protruding from the forward interior edge of base member 6, above the workpiece. Liftplate 68 is provided with a collar 78 which is provided with a groove or receptacle 80 which is adaptable to receive pivot arm 76 and permit the rotation of lift plate 68 thereabout. The degree of rotation of lift plate 68 is controlled by the length of slots 74 in the sides of top frame member 4. As stated, we presently limit the angular movement of lift plate 68 to about 7.5 degrees, but any angle, or any number of angles, may be selected.

Integrity of the operation of the router attachment 2 of the present invention is enhanced by a handle 82 which is fixed at its proximal end 82p to base member 6, and at its distal end 82d to top frame member 4. By gripping handle 82 during use, the operator can better maintain the indexing pin 34 against the indexing surface 36 of the just-cut dentil slot 38, which increases the stability of the router attachment 2 during cutting. Handle 82 is also provided with an ergonomic thumb rest 84 for greater operator comfort.

To use the present invention, a router 1 is attached to router attachment 2. Then the router bit cutting depth is set. This is accomplished by turning the router and attachment upside down and advancing carriage 5 so that about one-half of the router bit is visible past fence surface 12 of base member 6; the router bit depth is then set in reference to bottom surface of frame member 4 and liftplate 68 (i.e., those surfaces which will engage the upper surface of workpiece 90), using techniques that are well known, according to the directions of the manufacturer of the router.

After the router bit depth is set, the user is ready to set the length of cut, using length-of-cut mechanism 50. With indexing mechanism 30 in retracted position (see. ref. 30(r) of FIG. 23), the fence 12 of router attachment 2 is positioned against the front surface of worktable 86. Router bit 10 is rotated so that its cutting edge or largest diameter is facing the front surface of worktable 86. Then the back adjusting knob 58 is tightened while at the same time carriage member 5 is moved forward until router bit 10 is just touching the front surface of worktable 86. Then adjust knobs 53A and 53B to position pointer 60 to the desired length of cut along indicia 62, and lock pointer 60 into position. Then tighten lock knob 58 against retainer 59. At present, the router attachment 2 of the present invention is capable of a maximum cut of about four inches in length, and the length of cut mechanism 50 will permit accurate and repeatable serial lengths of cut of any dimension four inches in length or less.

When the router bit depth and the length of cut are both set, the workpiece 90 is set up to be cut upon. A recommended procedure is set forth in FIG. 22. Workpiece 90 is lain parallel to the front edge of worktable 86. At the left side of worktable 86, a piece of reference/stop lumber 92 the same thickness as the workpiece 90 is secured to worktable 86 via C-clamp 88 or other means; at the right edge of worktable 86, a similar clamp 88 secures workpiece 90 to worktable 86. Reference/stop lumber 92 has a notch 93 cut therein to receive the left edge of workpiece 90.

Figure 22:
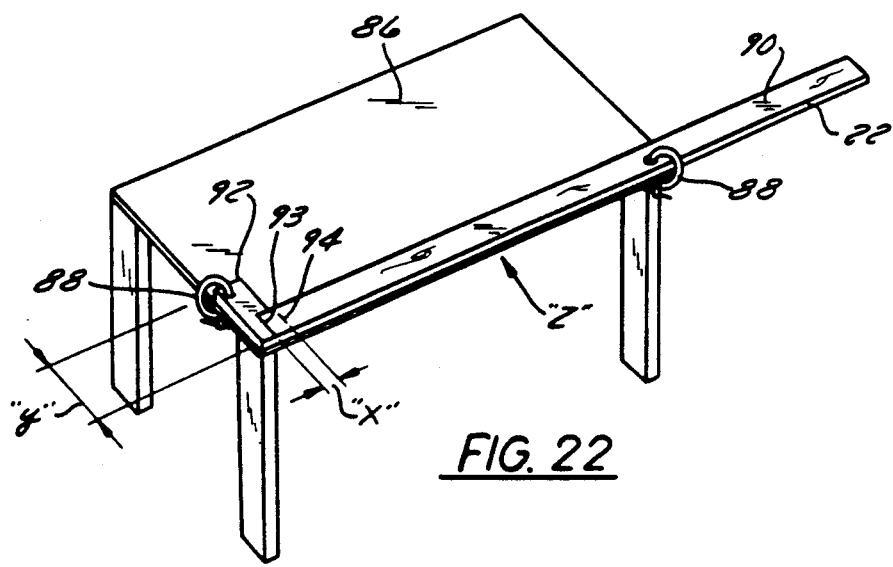
FIG. 22 shows a recommended worktable setup for retaining the workpiece prior to using the present invention.

In setting up the worktable, it is helpful to keep three dimensions in mind, represented in FIG. 22 by the letters "x", "y" and "z" Notch 93 of reference/stop lumber 92 should be of sufficient width "x" (for example, about 1.5") to adequately embrace workpiece 90. The depth of the notch 93 of reference/stop lumber 92 should be slightly less than the corresponding dimension of workpiece 90, so that the front surface 22 of workpiece 90 protrudes in front of the front edge of table 86 by the distance "z", for example, about ¼" or more. The length "Y" of reference/stop lumber 92 should be sufficient so that clamp 88 may be positioned such that the router attachment 2 of the present invention will not impact clamp 88 during operation while making dentil cuts. When workpiece 90 is secured to worktable 86, reference line 94 is drawn upon workpiece 90, to indicate where the first dentil cut is to be made.

The user is now ready to make dentil cuts with the present invention. This is explained by reference to FIGS. 23-27, which show the router attachment 2 of the present invention without router 1 thereupon for clarity In FIG. 23, the first cut is ready to be made along the centerline 10 CL (the centerline of router bit 10) which is aligned with reference line 94 drawn upon workpiece 90. Indexing pin assembly 30 is placed in retracted position 30r, such that the distal end 34 of the indexing pin does not protrude beyond fence surface 12 and contact workpiece 90. Centerline 10CL is aligned with reference line 94, and the user holds handle 82 with his left hand, while using his right hand to engage and operate router 1. Using the right hand, the operator pushes forward on the router 1 (i.e., perpendicular to fence surface 12 and abutting surface 22 of workpiece 90) which is mounted upon carriage 5, until positioning knob 53B of length of cut mechanism 50 strikes housing 56 and slidable plate 5 can be pushed forward no more. The first or initial dentil cut 38i is then complete, and router 1 is turned off.

Figure 24:
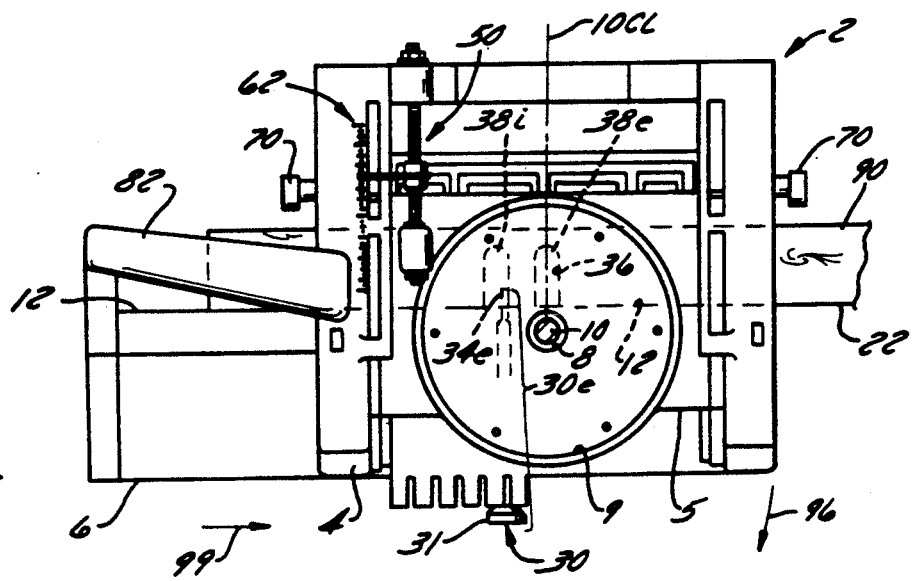

For ensuing dentil cuts 38e, refer next to FIG. 24. Indexing pin assembly 30 is placed in its engaged position 30e, with distal end 34e protruding beyond fence surface 12. With router 1 off and indexing assembly 30 in the engaged position 30e, move or slide the router attachment 2 to the right until the engaged indexing pin 34e falls within the initial dentil slot 38i, and continue moving router attachment 2 to the right until the right-most edge of indexing pin 34e is resting against the right-most edge (i.e., the indexing edge) 36 of initial dentil cut 38i. The user is now ready to continue making ensuing dentil cuts 38e. Router 1 is turned on and with his left hand on handle 82 the operator urges router attachment rightward in the direction indicated by arrow 99, so as to maintain constant contact of engaged indexing pin 34e with indexing surface 36 of initial dentil cut 38i. With his right hand, the operator pushes router 1 forward in the same fashion as used to complete cut 38i, until ensuing dentil cut 38e is completed, and carriage member 5 with router 1 thereon (and still running) is returned to position so that bit 10 no longer is capable or contact with workpiece 90.

Figure 25:
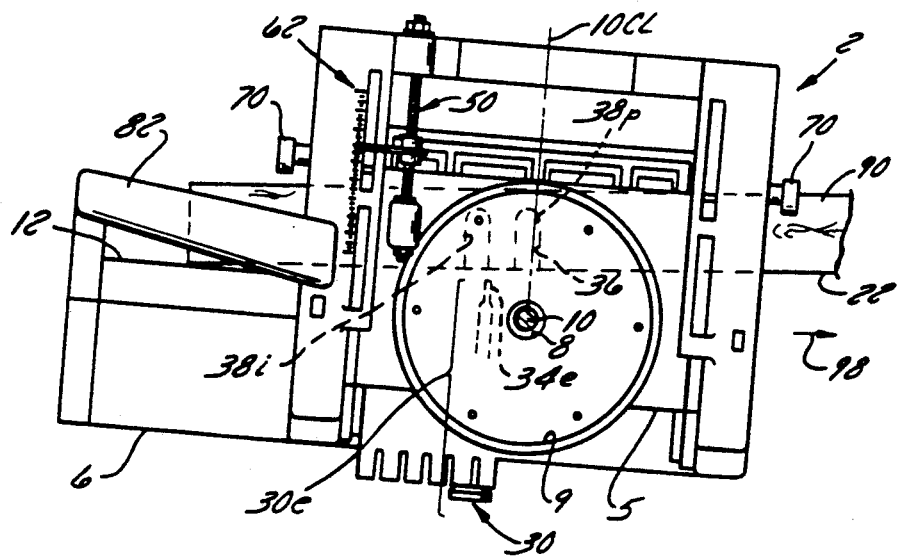
Figure 26:
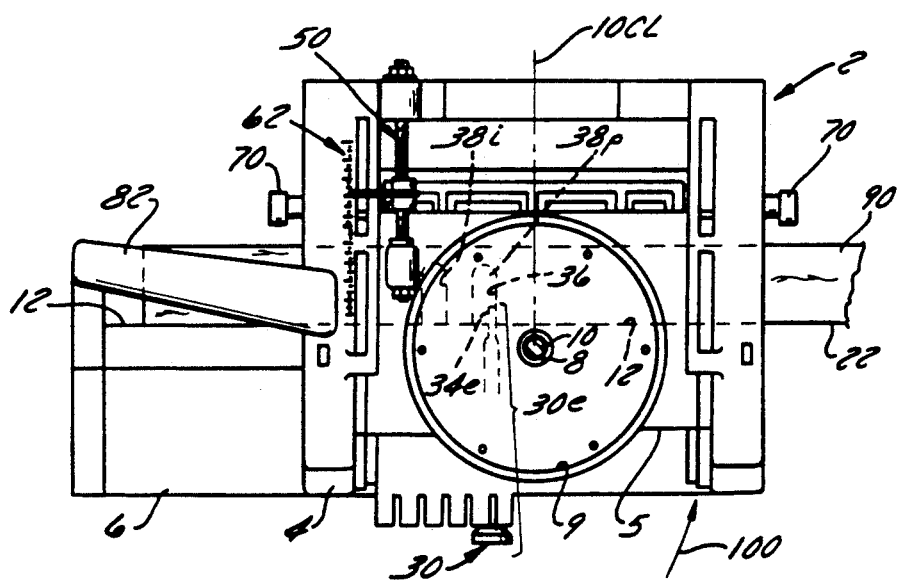
Figure 27:
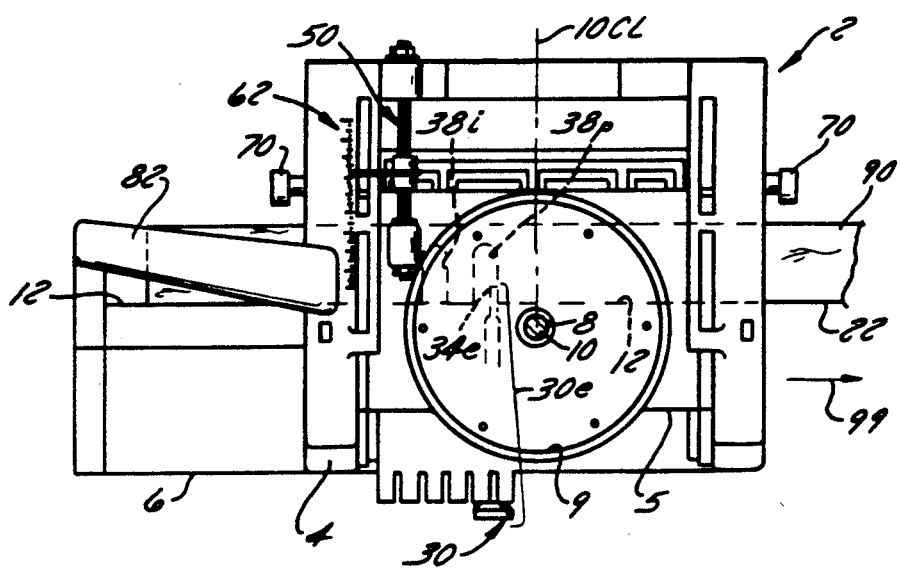

Upon completion of ensuing dentil cut 38e, with his right hand the operator pulls back on the router in the rotary direction indicated in FIG. 24 by arrow 96. In this fashion, with the router still running, the entire router attachment 2 is pivoted clockwise about a pivot point to the left-most edge of base 6, as shown in FIG. 25. The router attachment is pivoted back away from workpiece 90 to break contact between indexing pin 34e and the indexing surface 36 of the dentil cut in which it was just previously engaged (in the case of the completion of the second dentil cut, the indexing pin 34e would have been resting in dentil slot 38i). At this point, router attachment is free to be moved laterally to the right, indicated by direction arrow 98. Router attachment 2 is moved rightward until the operator "feels" the engaged distal end of indexing pin 34e fall into the dentil slot just previously cut, 38p, and the router attachment 2 is then rotated counterclockwise as indicated by direction arrow 100 or FIG. 25 until indexing pin 34e falls within the dentil cut just previously completed 38p. Using his left hand, the operator continues to urge router attachment 2 to the right (direction arrow 99) until the right-most surface of indexing pin 34e is abutting indexing surface 36 of the previously cut dentil slot 38p. The operator is now ready to cut the next dentil slot 38e, as shown in FIG. 27.

Figure 23:
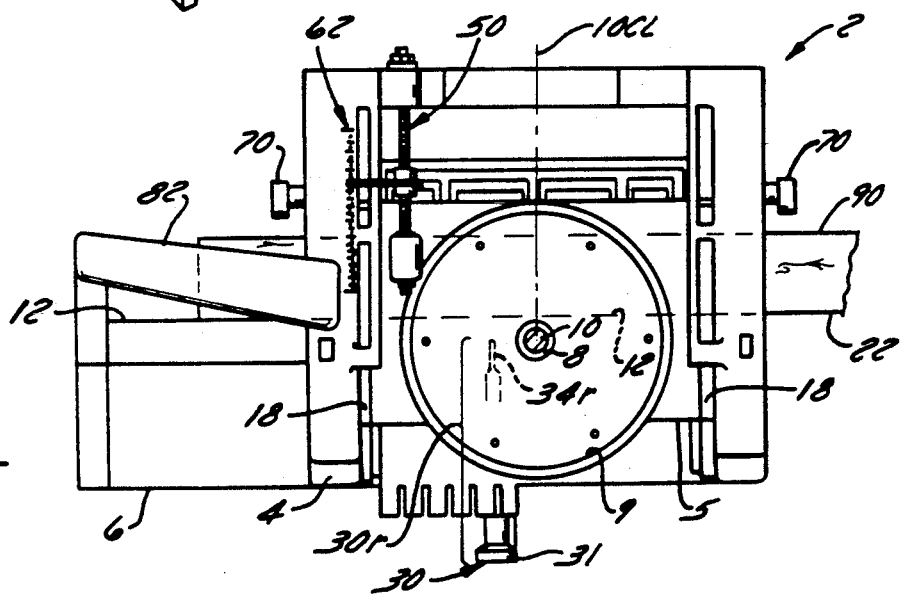
FIGS. 23-27 show the cutting process using the present invention.

The process of FIGS. 24–27 is repeated until all of the desired dentil cuts have been made in workpiece 90. Then a new workpiece 90' is affixed to worktable 86 as shown in FIG. 22, the first cut on workpiece 90' is accomplished as shown in FIG. 23, and ensuing cuts are accomplished as shown in FIGS. 24–27. This process is repeated until sufficient dentil moulding has been fabricated according to the wishes of the operator.

The spacing between the centerlines of successive dentil cuts 38 will be controlled by a combination of the diameter of the router bit 10 and the selection of indexing aperture, 32A 32B or 32C, according to the following table:

TABLE I

| Index Aperture/Bit Width | Spacing | | | |
|---|---|---|---|---|
| | 1/4" | 3/8" | 1/2" | 3/4" |
| 32A (first, or left) | 1-1/16" | 1-1/8" | 1-3/16" | 1-5/16" |
| 32B (middle) | 2-3/16" | 2-1/4" | 2-5/16" | 2-7/16" |
| 32C (third, or right) | 3-5/16" | 3-3/8" | 3-7/16" | 3-9/16" |
| Space Between Cuts (from right edge to left edge of next cut) | | | | |
| | 1/4" | 3/8" | 1/2" | 3/4" |
| 32A | 13/16" | 3/4" | 11/16" | 9/16" |
| 32B | 1-15/16" | 1-7/8" | 1-13/16" | 1-11/16" |
| 32C | 3-1/16" | 3-0" | 2-15/16" | 2-13/16" |

The router attachment of the present invention is capable of cutting dentil cuts using a variety of different sizes (up to about 3/4" in cutting diameter) and shapes of router bits for router bit 10, including but not limited to: ogee, classic, ogee open end, core box, straight face, dovetail cutter, V-groove, hinge mortising, point cutting ogee, point cutting, and veining bit.

When it is desired to do edge cutting with the present invention, that may be accomplished independent of any dentil cuts, or after the dentil cuts 38 are made, as shown in FIGS. 17 or 19. FIG. 19 shows a straight dentil cut 38st of uniform depth, made with the lift plate 68 in the "parallel" position 68A. FIG. 17 shows a tapered or slanted dentil cut 38sl made with liftplate 68 in the angled position 68B, so that the start of the dentil cut 38s is cut deeper into the workpiece 90 than at the end or finish 38f. After all the tapered dentil outs 38 were completed, a different router bit was placed on the router, and the length of cut mechanism 50 was locked into position so that router bit 10 extended beyond fence surface 12 the desired distance, and edge cut 39 could take place. Edge cutting is accomplished very much the same as edge cutting without using the router attachment, in that the router assembly 2 is moved laterally parallel to surface 22 of workpiece 90 until the desired length of edge has been cut. Indexing mechanism 30 must be in retracted position 30r to accomplish edge cutting. Edge cutting may be accomplished with the lift plate 68 in either the parallel position 68A or the angled position 68B.

The present invention is also capable of making flute cuts, as shown by reference 37 of FIG. 18. Flute cuts can only be accomplished with the lift plate in parallel position 68A. The router bit is positioned over the starting point with the left end of router attachment 2 resting upon the upper surface or workpiece 90 (a wooden stop [not shown] may be used to position the left end of router attachment in a fixed position), and the right end of router attachment 2 is lifted about one and one-half inches (1½"), enough for the router bit 10 to clear the workpiece. The router bit 10 is plunged into the workpiece to begin the flute cut 37 and the router attachment 2 is moved laterally the desired distance to the right to complete the flute cut 37. A wood or other stop [not shown] may be positioned at the right edge of the workpiece to control the distance of the flute cut(s) 37. Of course, when doing flute cuts, only use a router bit 10 recommended for plunge cutting. Indexing mechanism 30 must be in retracted position 30r to accomplish flute cutting.

The foregoing description (including, of course, reference to the drawings) from the basis for the claims of our invention which are appended hereto. Of course, the foregoing description is exemplary only, as there are many alternatives available to those skilled in the art to practice our invention. Therefore, the foregoing description should not be viewed in any way as limiting the scope of our invention, for it will be obvious to those skilled in the art that modifications may be made to our invention without departing from the scope or spirit of the present invention.

We claim:

1. A router attachment for making dentil cuts into the surface of a workpiece, comprising:
    a top frame member having a substantially flat bottom surface adapted to rest upon the top surface of a workpiece and including a base member defining a substantially flat front surface for abutting the face of the workpiece into which the cut is to be made both before and during cutting;
    a substantially flat carriage member adapted to be received by said top frame member and having a top surface adapted to receive a router thereon and defining a central opening therein large enough to receive the bit of said router for aligning said router with the workpiece both before and during cutting;
    cooperating means on said carriage member and said top frame member for slidably mounting said carriage member to said top frame member to permit motion of said carriage member relative to said base member in a direction perpendicular to said flat front surface of said base member and permit said router bit to cut into the workpiece, so that said carriage member can move in said perpendicular direction and permit said router bit to cut into the workpiece along said perpendicular direction while said base member remains in fixed contact with the face of the workpiece; and
    indexing means mounted on said base member to position said base plate and said router bit laterally along the workpiece for ensuing cuts in fixed selected relationship to the cut of said router bit just completed in the workpiece.

2. The router attachment of claim 1 wherein said indexing means includes multiple positions each adapted to provide a selected distance between said dentil cuts.

3. The router attachment of claim 2 further including spring means cooperating with said base member and said carriage member for returning said carriage member to its beginning position after the cut is complete.

4. The router attachment of claim 3 further including length of cut gauging means mounted upon said carriage member to permit said router to cut in said perpendicular direction for selected distances.

5. The router attachment of claim 4 further including lift plate means attachable to said carriage member whereby when said lift plate means are engaged in a first position, said cutting along said perpendicular direction is tapered, with the beginning of said cut having a greater depth than the end of said cut, and when said lift plate means are engaged in a second position said cutting along said perpendicular direction is of uniform depth from the beginning to the end of the cut.

6. The router attachment of claim 5, wherein said lift plate means is provided with multiple selected positions to permit cutting of selected tapers from the beginning of the cut to the end of the cut.

7. A router attachment as in claim 6, further including handle means affixed to said top frame member and said base member to retain said base member and said top frame member in fixed relationship while said carriage member is slidably moved along said top frame member in said perpendicular direction during cutting.

8. A router attachment of for making dentil cuts into the surface of a workpiece, comprising:
    a substantially flat carriage member adapted to be fixed to the bottom of a router and to rest upon the top surface of a workpiece for aligning said router with the workpiece both before and during cutting, said carriage member having a top surface and defining a central opening therein large enough to receive the bit of said router;
    a base member defining a substantially flat front surface for abutting the face of a workpiece into which the cut is to be made both before and during cutting;
    cooperating means on said carriage member and said base member for slidably mounting said carriage member upon said base member to permit motion of said carriage member relative to said base member in a direction perpendicular to said flat front surface of the workpiece and permit said router bit to plunge into said workpiece, so that said carriage member can move in said perpendicular direction and permit said router bit to cut into the workpiece along said perpendicular direction while said base member remains in fixed contact with the face of the workpiece; and
    indexing means mounted on said base member to position said base plate and said router bit laterally along the workpiece for ensuring cuts in fixed selected relationship to the cut of said router bit just completed in said workpiece,
    wherein said cooperating means on said carriage member and said base member for slidably mounting said carriage member on said base member comprises a pair of elongated ridges on one of said members and a cooperating pair of elongated grooves defined in the other of said members adapted to receive said elongated ridges, wherein said elongated grooves and ridges lie perpendicular to said flat front surface of said base member.

* * * * *